(12) United States Patent
Xia (10) Patent No.: US 8,429,263 B2
(45) Date of Patent: Apr. 23, 2013

(54) FILE CONTENT DISTRIBUTION METHOD, DEVICE, AND SYSTEM FOR AN INTERACTIVE NETWORK TELEVISION SYSTEM

(75) Inventor: Hongfei Xia, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 369 days.

(21) Appl. No.: 12/811,563

(22) PCT Filed: Dec. 31, 2008

(86) PCT No.: PCT/CN2008/073889
§ 371 (c)(1),
(2), (4) Date: Jul. 2, 2010

(87) PCT Pub. No.: WO2009/086784
PCT Pub. Date: Jul. 16, 2009

(65) Prior Publication Data
US 2010/0293585 A1  Nov. 18, 2010

(30) Foreign Application Priority Data
Jan. 3, 2008  (CN) .......................... 2008 1 0000085

(51) Int. Cl.
*G06F 15/173* (2006.01)
*G06F 15/16* (2006.01)
*H04N 7/173* (2011.01)

(52) U.S. Cl.
USPC ........... 709/223; 709/203; 709/224; 709/225; 709/226; 725/109; 725/115; 725/116

(58) Field of Classification Search .................. 709/223, 709/203, 224, 225, 226; 725/109, 115, 116
See application file for complete search history.

(56) References Cited

U.S. PATENT DOCUMENTS

| 2002/0046405 A1 | 4/2002 | Lahr |
| 2003/0074393 A1* | 4/2003 | Peart ............................ 709/203 |
| 2004/0015986 A1 | 1/2004 | Carver |
| 2005/0015464 A1* | 1/2005 | Young ........................... 709/219 |
| 2005/0278760 A1 | 12/2005 | Dewar |
| 2007/0271186 A1 | 11/2007 | Kurihara |
| 2008/0065718 A1* | 3/2008 | Todd et al. .................... 709/203 |

FOREIGN PATENT DOCUMENTS

| CN | 1661956 A | 8/2005 |
| CN | 101001356 A | 7/2007 |
| CN | 101005369 A | 7/2007 |
| JP | 2007140930 A | 6/2007 |

* cited by examiner

Primary Examiner — Hoang-Vu A Nguyen-Ba
(74) Attorney, Agent, or Firm — Li & Cai Intellectual Property (USA) Office (57) ABSTRACT

The present invention discloses file content distribution method, device and system, wherein, the method includes: a content preparing means selecting one or more content location and distribution global controlling means, and sending a file content distributing requests to the selected content location and distribution global controlling means; after receiving the file content distributing request, the content location and distribution global controlling means selecting one or more content delivery and storage controlling means according to a predetermined distributing strategy, and transmitting the file content distributing requests to the selected content delivery and storage controlling means; after receiving the file content distributing request, the content delivery and storage controlling means selecting one or more content delivering and storing means according to the predetermined distributing strategy, and transmitting the file content distributing request to the selected content delivering and storing means; and after receiving the file content distributing request, the content delivering and storing means establishing a link to the content preparing means and distributing file content.

17 Claims, 6 Drawing Sheets

FILE CONTENT DISTRIBUTION METHOD, DEVICE, AND SYSTEM FOR AN INTERACTIVE NETWORK TELEVISION SYSTEM

FIELD OF THE INVENTION

The present invention relates to an interactive network television system, and more specifically, to a file content distribution method, device and system for a broadband network or Next Generation Network.

BACKGROUND OF THE INVENTION

With the development of Interactive Network Television system (IPTV system) technology and the increase of the number of users, it is required a higher performance and reliability to the system, especially to the content delivery module of the interactive network, whose function and interaction with other system modules are important research topics. To improve user experience, the main functions of respective modules need to be made as clear as possible, and the interactions between respective parts in the system need to be reduced, which requires a more simple and reliable architecture of content distribution system and service process.

Currently, the IPTV technology is still at the development stage, for IPTV products of various companies, orientations of various subsystems (mainly including an IPTV terminal means, an IPTV application means, a content delivery means, a managing means, and etc.) in the IPTV system and the definitions of the logic relationship between their interfaces are not clear. Currently there has not been a mature solution for realizing an interactive network television service under Next Generation Network (NGN for short) architecture, IP Multimedia Subsystem (IMS for short) architecture or non NGN architecture.

Under the IMS architecture, currently, there has not been a perfect solution for supporting such complex video type service as the interactive IPTV; in addition, as the interactive IPTV has to complete vast files provided by many service providers, or live broadcast, distribution and storage of the content of a time-shift stream and video services of a terminal, reasonable orientations of the modules and their interaction with other modules will affect the performance of the interactive IPTV system.

Therefore, how to design a new content delivery system, which can highly efficiently complete distribution of the content based on a file and a stream with little interaction between respective modules has not been realized currently.

SUMMARY OF THE INVENTION

The present invention is provided in consideration of a current problem of the need of a highly efficient content delivery technical system. Therefore, the present invention mainly aims at providing an improved file content distribution solution suitable for a broadband network or Next Generation Network (NGN, IMS).

To achieve the above object, according to one aspect of the present invention, a file content distribution method is provided.

The file content distribution method according to the present invention can include the following steps: step 1, a content preparing means selecting one or more content location and distribution global controlling means, and sending a file content distributing requests to the selected content location and distribution global controlling means; step 2, after receiving the file content distributing request, the content location and distribution global controlling means selecting one or more content delivery and storage controlling means according to a predetermined distributing strategy, and transmitting the file content distributing requests to the selected content delivery and storage controlling means; step 3, after receiving the file content distributing request, the content delivery and storage controlling means selecting one or more content delivering and storing means according to the predetermined distributing strategy, and transmitting the file content distributing request to the selected content delivering and storing means; and step 4, after receiving the file content distributing request, the content delivering and storing means establishing a link to the content preparing means and distributing a file content.

Preferably, the following processing is performed in step 1: determining whether there is a file content in the content preparing means, and the content preparing means selects one or more content location and distribution global controlling means if the result of the determination is positive, otherwise end the processing.

In step 1, when there are multiple content location and distribution global controlling means, the mode that the content preparing means selects the content location and distribution global controlling means comprises at least one of: selecting the content location and distribution global controlling means according to a default configuration; and selecting the content location and distribution global controlling means according to selecting configuration information.

Wherein, the selecting configuration information at least includes: the modular structure of the content location and distribution global controlling means and information regarding the file content, and the information regarding the file content at least includes the terminal location information of the file content.

In the embodiment of the present invention, the interactive network television system further includes a content distribution and management unit, and based on this, prior to step 1, the method can further includes determining whether there is the content distribution and management unit in the content preparing means.

When it is determined that there is not the content distributing and managing unit in the content preparing means, the method can further includes: the content distributing and managing unit inquiring about the file content that needs to be distributed; and the content distributing and managing unit sending the file content as inquired about to the content preparing means, wherein, the manner that the content distributing and managing unit inquires about the file content that needs to be distributed at least includes: automatically inquiring about a timing task.

Optionally, when it is determined that there is the content distributing and managing unit in the content preparing means, the method can further includes: the content preparing module inquiring about the file content that needs to be distributed, wherein, the mode that the content preparing means inquires about the file content that needs to be distributed at least includes: automatically inquiring about a timing task.

The following processing can also be performed in step 3: the content delivering and storing means sends a file content selection confirmation message to the content delivery and storage controlling means; the content delivery and storage controlling means sends the file content selection confirmation message to the content location and distribution global controlling means; and the content location and distribution global controlling means sends the file content selection confirmation message to the content preparing means, wherein, the file content selection confirmation message at least includes: the location information of a media server that can store the file content.

When it is determined that there is not the content distributing and managing unit in the content preparing means, the following processing can be further performed in step 3: the content preparing means notifies the content distributing and managing unit to start preparing the distribution of the file content and carries the information of the file content to be distributed, and then execute step 4, wherein, the information of the file content to be distributed at least includes a content logic identifier.

In step 4, the distribution manner of the file content includes at least one of: a PULL mode, wherein, the content delivering and storing means actively requests the file content from the content preparing means; and a PUSH mode, wherein, the content preparing means actively pushes the file content to the content delivering and storing means.

In the PULL mode, the following processing is performed in step 4: step a, the content preparing means sends a preparing PULL file request to the content delivering and storing means; step b, the content delivering and storing means responds to the content preparing means and acquires the file content in the content preparing means according to the preparing PULL file request; step c, the content delivering and storing means sends an adding file content request message to the content delivery and storage controlling means, and the content delivery and storage controlling means returns an adding file content confirmation message to the content delivering and storing means; step d, the content delivery and storage controlling module transmits the adding file content request message to the content location and distribution global controlling means, and the content location and distribution global controlling means returns the adding file content confirmation message to the content delivery and storage controlling means; step e, the content location and distribution global controlling means sends the adding file content request message to the content preparing means, and the content preparing means returns an adding file content confirmation message to the content location and distribution global controlling means; step f, the content delivering and storing means sends a file content transmission completed confirmation message to the content preparing means through the content delivery and storage controlling means and the content location and distribution global controlling means; and step g, the content preparing means sends a file content transmission completed response message to the content delivering and storing means through the content location and distribution global controlling means and the content delivery and storage controlling means.

Wherein, the preparing PULL file request includes information corresponding to the file content to be PULL, and the information corresponding to the file content at least includes Internet Protocol, IP, address information and port information.

When there is not the content distributing and managing unit in the content preparing means, in step e, after the content preparing means returns the adding file content confirmation message to the content location and distribution global controlling means, the content delivering and storing means sends a file content distribution progress notification message to the content distributing and managing unit. In step f, after the content location and distribution global controlling means sends the file content transmission completed confirmation message to the content preparing means, the content preparing means sends the file content transmission completed notification message to the content distributing and managing unit.

Optionally, in the PUSH mode, the following processing is performed in step 4: step A, when the content preparing means is sending the file content to the content delivering and storing means, the content preparing means sends an adding file content request message to the content location and distribution global controlling means, and the content location and distribution global controlling means returns an adding file content confirmation message to the content preparing means; step B, the content location and distribution global controlling means sends the adding file content request message to the content delivery and storage controlling means; and the content delivery and storage controlling means returns an adding file content confirmation message to the content location and distribution global controlling means; step C, the content delivery and storage controlling means sends the adding file content request message to the content delivering and storing means, and the content delivering and storing means returns the adding file content confirmation message to the content delivery and storage controlling means; step D, the content preparing means sends a file content transmission completed notification message to the content delivering and storing means through the content location and distribution global controlling means and the content delivery and storage controlling means; and step E, the content delivering and storing means returns a file content transmission completed confirmation message to the content preparing means through the content delivery and storage controlling means and the content location and distribution global controlling means.

When there is not the content distributing and managing unit in the content preparing means, in step A, after the content preparing means sends the adding file content request message to the content location and distribution global controlling means, the content preparing means sends a file distribution progress notification message to the content distributing and managing unit. In step D, after the content preparing means sends the content transmission completed notification message to the content location and distribution global controlling means, the content preparing means sends the file content transmission completed notification message to the content distributing and managing unit.

To achieve the above objects, according to another aspect of the present invention, a file content distribution device is further provided, including: a content preparing means configured to select one or more content location and distribution global controlling means, and to send file content distribution requests to the selected content location and distribution global controlling means; a content location and distribution global controlling means configured to select, after receiving the file content distribution requests, one or more content delivery and storage controlling means according to a predetermined distribution strategy, and to transmit the file content distribution requests to the selected content delivery and storage controlling means; a content delivery and storage controlling means configured to select, after receiving the file content distribution requests, one or more content delivering and storing means according to the predetermined distribution strategy, and to transmit the file content distribution requests to the selected content delivering and storing means; and the content delivering and storing means configured to establish, after receiving the file content distribution requests, a link to the content preparing means and to distribute a file content.

The predetermined distribution strategy includes at least one of: location information and load state information.

The content delivery and storage module includes at least one of: a delivering unit, a caching and storing unit and a distributing unit, wherein, the delivering unit is configured to send a file content to be delivered to a terminal user and provide file downloading and uploading from the terminal user, the caching and storing unit is configured to cache a time-shift live broadcast stream and store a file content, and the distributing unit is configured to distribute, under the control of the content delivery and storage controlling means, the live broadcast or time-shift stream and the file content in the content of the content delivering and storing module and receive the file content of the content preparing means.

The content location and distribution global controlling means includes at least one of: a first location controlling unit, configured to select the content delivery and storage controlling means according to a predetermined rule; and a first distribution controlling unit configured to process the file content distribution request from the content preparing module.

Wherein, the predetermined rule includes at least one of the following: the location information of the content delivery and storage controlling means; the load state information of the content delivery and storage controlling means; the load state information of the content delivering and storing means; terminal location information; terminal capability information; and content distribution information.

The content delivery and storage controlling means includes at least one of the following: a delivery controlling unit configured to process media control information between a terminal user and the content delivering and storing means; a second location controlling unit configured to select the content delivering and storing means according to the predetermined rule; and a second distribution controlling unit, configured to process the file content distributing request from the content location and distribution global controlling means.

Wherein, the predetermined rule includes at least one of the following: the location information of the content delivering and storing means; the load state information of the content delivering and storing means; terminal location information; terminal capability information; and content distribution information.

To achieve the above object, according to another aspect of the present invention, a file content distribution system is further provided, and the system includes the above mentioned file content distribution device, a content provider, and a terminal user.

Wherein, the terminal user sends a service request to the file content distribution device, wherein, the service request includes at least one of the following: broadcast on demand request, live broadcast request and a time-shift request.

Also, the content preparing means in the file content distribution device performs content processing to the content provided by the content provider, wherein, the content processing includes at least one of the following: content aggregation, content management, metadata processing, and content encryption.

By way of at least one of the above mentioned technical solutions of the present invention, the present invention is compatible with following current IPTV systems at the same time: a current IPTV based on an IMS architecture, an IPTV based on an NGN architecture, and an IPTV based on a non NGN architecture, and enhances the reliability and expansibility of the IPTV system and reduces the cost of the IPTV system, and thus improves the core competence of the IPTV system.

Other features and advantages of the present invention will be detailed in the following text of the description and will partially become obvious from the description, or can be understood by implementing the present invention. The object and other advantages of the present invention can be achieved and obtained by the specifically indicated structures in the description, the claims and the accompanying drawings.

BRIEF DESCRIPTION OF THE ACCOMPANYING DRAWINGS

The accompanying drawings herein are used to provide further understanding of the present invention and constitute a part of the present application. The accompanying drawings are used to explain the present invention together with the embodiment of the present invention and shall not be construed as limitations on the same. In the accompanying drawings.

DETAILED DESCRIPTION OF THE INVENTION

Functional Overview

The main idea of the present invention is to complete distribution of a file content through interactions between various means in an IPTV system, and in the embodiments of the present invention, the means in the IPTV system include: content preparing means, content location and distribution global controlling means, content delivery and storage controlling means and content delivering and storing means. The technical solutions of the present invention are applicable to IPTV systems of various network architectures, have fine expandability and can improve the core competence of the IPTV system.

Preferable embodiments of the present invention will be described hereinafter in conjunction with the accompanying drawings, and it shall be understood that the preferable embodiments herein are just used to describe and explain the present invention and shall not be construed as limitations on the present invention. In case of no conflict, the embodiments of the present invention and the features in the embodiments can be mutually combined.

Figure 1:
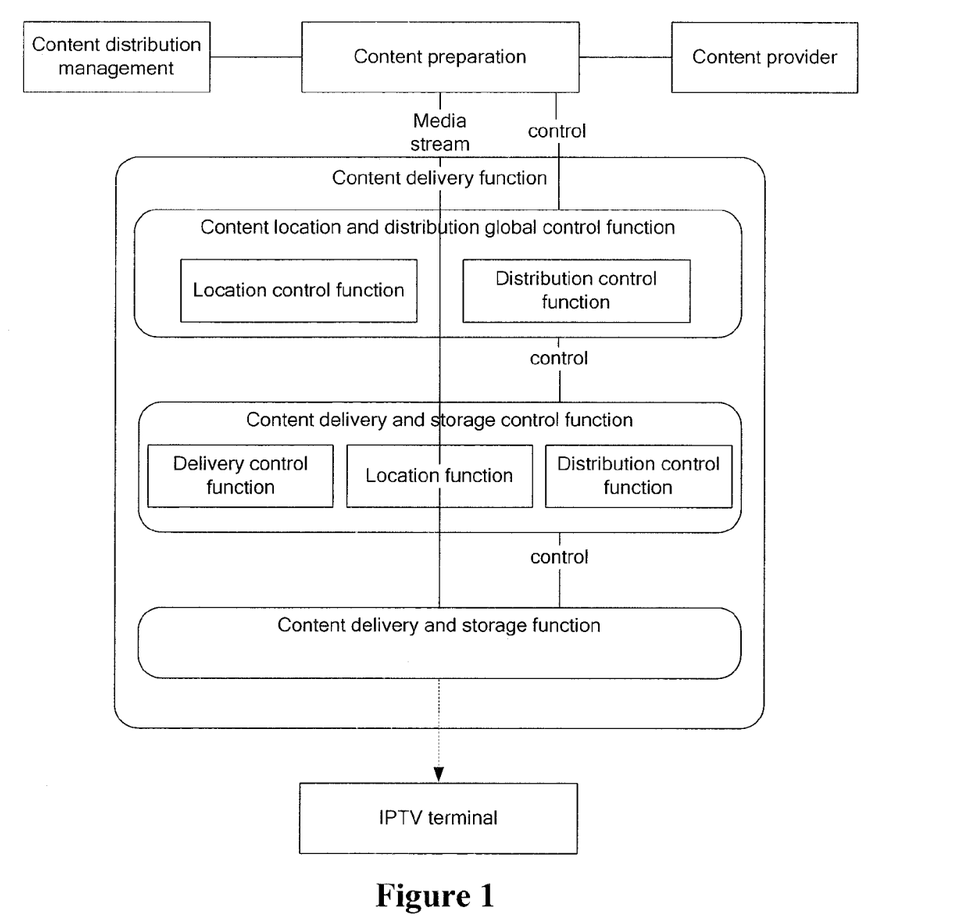
FIG. 1 illustrates the principle of distribution of the content delivery system of the interactive network television according to the embodiment of the present invention.

First, the IPTV system in which the embodiments of the present application are applied will be described, and FIG. 1 illustrates the principle of distribution of the content delivery system of the interactive network television according to the embodiment of the present invention. As shown in FIG. 1, it includes:

the content preparing means (Content Preparation Functions), configured to perform processings of Content Aggregation, Content Management, Metadata Processing, content encryption, and etc. to the content (including the content provided by a third party system other than the IPTV system) and metadata provided by a content provider, and it can convert the content provided by the content provider to a format that needs to be transmitted to an IPTV terminal. The general working principle of the means is described as follows: first, the content provided by content provider is acquired by content aggregation means in the content preparing means; metadata and right information are transmitted to metadata processing means, and the content will be coded and encrypted again using means of Content Processing and Content Encryption before being transmitted to content delivering (Content Delivery) means;

content distributing and managing means (Content Distribution Management Functions), configured to manage the content distribution in the content delivering means, for example, to arrange the distribution of the completely content-prepared content (which is usually performed in a mode of timing distribution when the content delivering means is idle, and the content that needs to be distributed is numbered and stored in a database, and is executed according to the timing), and it can be within the content preparing means or independent of the same, for example, it can be in the management means of the interactive network television;

a content provider (Content Provider Functions), a supplier having right to or being authorized to provide sales of a content or content property;

an IPTV terminal (IPTV Terminal Functions), a terminal device realized by an IPTV hardware and having a set-top box means, or realized by a pure software and having an IPTV set-top box means, and also including a home network means.

In addition, FIG. 1 further relates to the following three basic means:

Content Location and Distribution Global Controlling Means

At the IPTV terminal, during distributing the content by the content selection or content preparing means to the content delivering means, a proper content delivery and storage controlling means is selected to provide services according to information such as the location and load of a global content delivery and storage controlling means in the content delivering means.

Content Delivery and Storage Controlling Means

Respond to the content selection or distribution request of the content location and distribution global controlling means, and a proper content delivering and storing means is selected to provide services according to information such as the location and load of the content delivery and storage controlling means and the content delivering and storing means in a local content delivering means of the content delivering and storing means controlled by the content delivery and storage controlling means.

Content Delivering and Storing Means

It is a means that completes the distributing, the caching and storing of the content, and the sending of the same to the terminal user. This means mainly includes a delivering means (unicast and multicast delivery modes), a caching and storing means and a distributing means.

For the three basic means, according to actual networking situations, there may be multiple content location and distribution global controlling means which are organized under a certain structure. A default content location and distribution global controlling means is provided to the outside, and the final content location and distribution global controlling means that provides services is decided according to a corresponding structure, the parameter information (such as terminal location) corresponding to a requested file or a search algorithm, and etc.

In addition, according to actual networking situations, one content location and distribution global controlling means entity may correspond to multiple content delivery and storage controlling means. The content delivery and storage controlling means and the content delivering and storing means can constitute one local content delivering means, and one content delivery and storage controlling means can simultaneously manage and control multiple content delivering and storing means.

Various sub-means in the three basic means will be described in detail hereinafter.

(1). Sub-means in the Content Location and Distribution Global Controlling Means Location Controlling Means The location controlling means processes the request of distributing a content delivering and storing means resource from IPTV service control or IPTV application. The location controlling means selects a proper control delivery and storage controlling means, and specifically, the selection may be performed according to one or more of the following rules: the location information of the content delivery and storage controlling means; the load state information of the content delivery and storage controlling means; information such as the location and the capability of the terminal; content distribution information, and etc. Furthermore, when the content delivering and storing means fails or a program is missed, the location controlling means responds to a redirection request from the content delivery and storage controlling means, and re-selects the content delivery and storage controlling means.

Distribution Controlling Means

The distribution controlling means processes the content (a file or live broadcast stream) distribution request from the content preparing means, and selects a proper content delivery and storage controlling means according to a distributing strategy. For the distribution of a stream file, the distributing strategy can be configured to be fixed, or determined according to the service information of the content delivering and storing means under the control of the content delivery and storage controlling means, such as the load state. The distributing strategy of the file content may be determined according to one or more of the following rules: according to a preconfigured distribution path based on a designated area, according to content distribution information, or performing selection according to the information from location control. Furthermore, the distribution controlling means can respond to the content scheduling or deleting request, and etc. from the content preparing means or the content distributing and managing means (it can be in the content preparing means or the management means of the interactive television system), and completes corresponding operations according to the distributing strategy.

(2) Sub-means in the Content Delivery and Storage Controlling Means

Delivery Controlling Means

The means can process the media control information between the IPTV terminal and the content delivering and storing means it manages, for example, pause, fast forward, and fast rewind, to control the media stream of the content delivering and storing means.

Location Means

The location means processes the content selection request from the content location and distribution global controlling means. The location means selects a proper content delivering and storing means to provide a stream service to an IPTV media client terminal. The selection may be performed according to one or more of the following rules: the location information of the content delivering and storing means; the load state information of the content delivering and storing means; information such as the location and the capability of the terminal; content distribution information, and etc. Furthermore, when the content delivering and storing means fails or a program is missed, the location means responds to a redirection request from the content delivering and storing means, and re-selects the content delivery and storage controlling means, and if the selection cannot be made, the request is transmitted to the content location and distribution global controlling means.

Distribution Controlling Means

The distribution controlling means processes the content (a file or live broadcast stream) distribution request from the content location and distribution global controlling means, and selects a proper content delivering and storing means according to a distributing strategy. For the distribution of a stream file, the distributing strategy can be configured to be fixed, or determined according to the service information of the content delivering and storing means under the control of the content deliver and storage controlling means, such as the load state. The distributing strategy of the file content may be selected according to a preconfigured distribution path based on a designated area, according to content distribution information, or according to the information from the location means. One or more of the rules may be used. Furthermore, the distribution controlling means can respond to the content scheduling or deleting request, and etc. from the content location and distribution global controlling means, and completes corresponding operations according to the distributing strategy.

(3) Sub-means in the Content Delivering and Storing Means

Delivering Means

It is mainly used to transmit a content stream to be delivered to a media client terminal; and can also be used to provide file downloading from the media client terminal and upload a file means.

Caching and Storing Means

It is mainly used to cache a time-shift live broadcast stream and store file content.

Distributing Means

It is mainly used to distribute a live broadcast stream and file content in the content delivering and storing means under the control of the content delivery and storage controlling means, and can also receive the content of the content preparing means.

Method Embodiment

Figure 2:
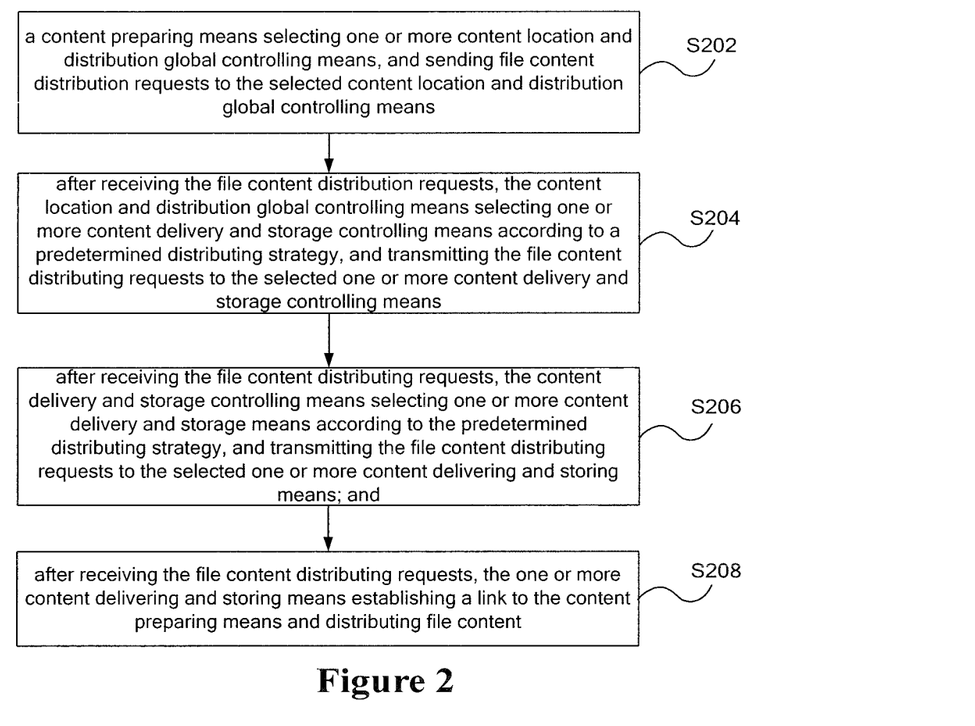
FIG. 2 is a flow chart of the file content distribution method according to the embodiment of the present invention.

According to the embodiment of the present invention, a file content distribution method is provided. The method can be used in a NGN network or IMS network. FIG. 2 is a flow chart of the file content distribution method according to the embodiment of the present invention. As shown in FIG. 2, the method includes the following steps:

S202, a content preparing means selects one or more content location and distribution global controlling means, and sends file content distribution requests to the selected content location and distribution global controlling means; it needs to be explained that the content preparing means, mentioned in this step, is preferably to contain a file content therein, and this step does not apply when there is no file content in the content preparing means;

S204, after receiving the file content distribution requests, the content location and distribution global controlling means selects one or more content delivery and storage controlling means according to a predetermined distributing strategy, and transmits the file content distributing requests to the selected content delivery and storage controlling means;

S206, after receiving the file content distributing requests, the content delivery and storage controlling means selects one or more content delivering and storing means according to the predetermined distributing strategy, and transmits the file content distributing requests to the selected content delivering and storing means; and S208, after receiving the file content distributing requests, the content delivering and storing means establishes a link to the content preparing means and distributing file content.

Details of the steps will be described hereinafter.

Preferably, prior to S202, determine whether there is a content distributing and managing unit in the content preparing means. According to the result of the processing:

(1) when it is determined that there is no content distributing and managing unit in the content preparing means, the content distributing and managing unit inquires about the file content that needs to be distributed, for example, inquiry can be made in a manner of automatically inquiring about a timing task, and sends the file content as inquired about to the content preparing means.

(2) When it is determined that there is the content distributing and managing unit in the content preparing means, the content preparing means inquires about the file content that needs to be distributed, for example, inquiry can be made in a manner of automatically inquiring about a timing task.

1. S202

In S202, when there are multiple content location and distribution global controlling means, the mode that the content preparing means selects the content location and distribution global controlling means includes at least one of: (1) selecting the content location and distribution global controlling means according to a default configuration; and (2) selecting the content location and distribution global controlling means according to selecting configuration information, and the selecting configuration information at least includes: the modular structure of the content location and distribution global controlling means and information regarding the file content (including terminal location information of the file content, and etc.).

2. S206

In S206, the following processing can be performed: the content delivering and storing means sends a file content selection confirmation message to the content delivery and storage controlling means; the content delivery and storage controlling means sends the file content selection confirmation message to the content location and distribution global controlling means; and the content location and distribution global controlling means sends the file content selection confirmation message to the content preparing means, wherein, the file content selection confirmation message at least includes: the location information of a media server that can store the file content.

In addition, as described above, if it is determined that there is not the content distributing and managing unit in the content preparing means, then the following processing can be further performed: the content preparing means notifies the content distributing and managing unit to start preparing the distribution of the file content and carry the information of the file content to be distributed in the notification, and the information at least includes a content logic identifier, and then execute step 4.

3. S208

In S208, the distribution mode of the file content includes, but not limited to, at least one of:

(1) a PULL mode, and in this mode, the content delivering and storing means actively requests the file content from the content preparing means.

Wherein, in the PULL mode, preferably, the following processing is further performed in S208:

In the PULL mode, the following processing is performed in step 4:

Step a, the content preparing means sends a preparing PULL file request to the content delivering and storing means, wherein, the request includes information corresponding to the file content to be PULL, for example, IP address information and port information;

Step b, according to the preparing PULL file request, the content delivering and storing means acquires the file content in the content preparing means;

Step c, the content delivering and storing means sends an adding file content request message to the content delivery and storage controlling means, and the content delivery and storage controlling means returns an adding file content confirmation message to the content delivering and storing means;

Step d, the content delivery and storage controlling means transmits the adding file content request message to the content location and distribution global controlling means, and the content location and distribution global controlling means returns an adding file content confirmation message to the content delivery and storage controlling means;

Step e, the content location and distribution global controlling means sends the adding file content request message to the content preparing means, and the content preparing means returns an adding file content confirmation message to the content location and distribution global controlling means; it needs to be explained that if there is not the content distributing and managing unit in the content preparing means, the content delivering and storing means sends a file content distribution progress notification message to the content distributing and managing unit;

Step f, the content delivering and storing means sends a file content transmission completion confirmation message to the content preparing means through the content delivery and storage controlling means and the content location and distribution global controlling means; it needs to be explained that if there is not the content distributing and managing unit in the content preparing means, the content preparing means sends the file content transmission completion notification message to the content distributing and managing unit; and Step g, the content preparing means sends a file content transmission completion response message to the content delivering and storing means through the content location and distribution global controlling means and the content delivery and storage controlling means.

(2) A PUSH mode, and in this mode, the content preparing means actively transmits or pushes the file content to the content delivering and storing means.

Optionally, in the PUSH mode, the following processing is performed in S208:

step A, when the content preparing means is sending the file content to the content delivering and storing means, the content preparing means sends an adding file content request message to the content location and distribution global controlling means, and the content location and distribution global controlling means returns an adding file content confirmation message to the content preparing means; it needs to be explained that if there is not the content distributing and managing unit in the content preparing means, preferably, after the content preparing means sends the adding file content request message, the content preparing means sends a file distribution progress notification message to the content distributing and managing unit;

step B, the content location and distribution global controlling means sends the adding file content request message to the content delivery and storage controlling means; and the content delivery and storage controlling means returns an adding file content confirmation message to the content location and distribution global controlling means;

step C, the content delivery and storage controlling means sends an adding file content request message to the content delivering and storing means, and the content delivering and storing means returns an adding file content confirmation message to the content delivery and storage controlling means;

step D, the content preparing means sends a file content transmission completion notification message to the content delivering and storing means through the content location and distribution global controlling means and the content delivery and storage controlling means; it needs to be explained that if there is not the content distributing and managing unit in the content preparing means, preferably, the content preparing means sends the file content transmission completion notification message to the content distributing and managing unit; and step E, the content delivering and storing means returns a file content transmission completion confirmation message to the content preparing means through the content delivery and storage controlling means and the content location and distribution global controlling means.

Figure 3:
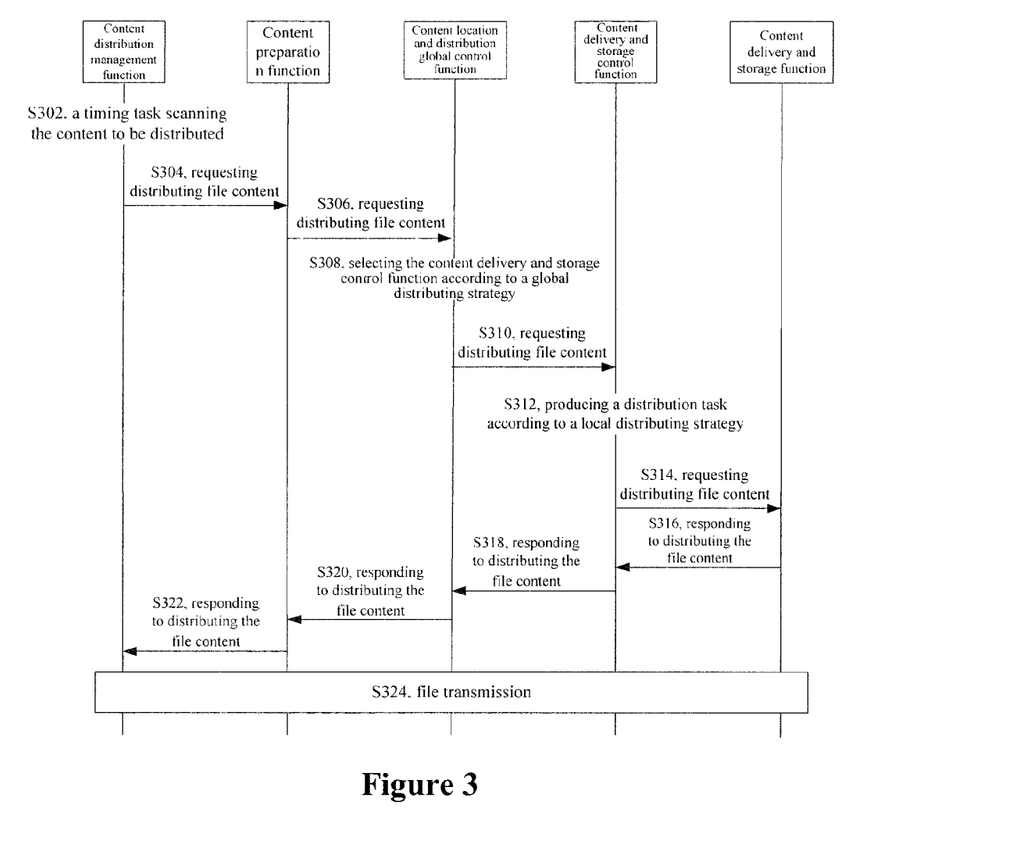
FIG. 3 is a general flow chart of the file content distribution of the interactive network television system according to the embodiment of the present invention.

FIG. 3 is a general flow chart of the processing of the file content distribution of the interactive network television system according to the embodiment of the present invention. Prior to executing the steps shown in FIG. 3, the content provider needs to transmit the file content to the content preparing means, and the content preparing means has finished preparations of a file such as content aggregation, content coding, content management and encryption processing before transmits the same to the delivery controlling means, and a content delivery management means has recorded the task of the file content that needs to be distributed. As shown in FIG. 3, it specifically includes the following steps:

S302, the content distributing and managing means periodically scans the task of a file content that needs to be distributed;

S304, the content distributing and managing means sends scanned information (such as a content logic identifier) of the file content that needs to be distributed to the content preparing means;

S306, the content preparing means checks whether there is the file content in it, and transmits the file content distribution information to the content location and distribution global controlling means if the file content exists in it (if there exist multiple file contents, default selection is performed, and the content location and distribution global controlling means selects a proper content location and distribution global controlling means according to its structure and file information);

S308, after receiving the file distribution request from the content preparing means, the content location and distribution global controlling means produces a distribution task according to the distributing strategy to select a relatively most preferable content delivery and storage controlling means, and the distributing strategy may be one of: (1) performing distribution according to a preconfigured distributing path based on a designated area; (2) during operation, the system automatically makes statistics of the audience rating of the content to distribute according to the use of the content by users; and (3) based on the load of the content delivering and storing means, dynamically and automatically maintaining the distribution of the content in a network using an intelligent distributing strategy.

S310, after selecting the content delivery and storage controlling means, the content location and distribution global controlling means transmits the file content sending request of the content preparing means to the selected content delivery and storage controlling means;

S312, after receiving the file distributing request from the content location and distribution global controlling means, the content delivery and storage controlling means produces a distribution task according to the distributing strategy to select a relatively most preferable content delivering and storing means, and the distributing strategy may be one of: (1) performing distribution according to a preconfigured distributing path based on a designated area; (2) during operation, the system automatically makes statistics of the audience rating of the content to distribute according to the use of the content by users; and (3) based on the load of the content delivering and storing means, dynamically and automatically maintaining the distribution of the content in a network using an intelligent distribution strategy;

S314, the content delivery and storage controlling means selects the content delivering and storing means, and transmits the file content sending request of the content preparing means to the content delivering and storing means;

S316, the content delivering and storing means returns a file content selection confirmation message to the content delivery and storage controlling means, and the message can carry the location information of a media server that can store the file content;

S318, the content delivery and storage controlling means transmits the information of the media server that can store the file content acquired by the content delivering and storing means to the content location and distribution global controlling means;

S320, the content location and distribution global controlling means transmits the information of the media server that stores the file content acquired by the content delivering and storing means to the content preparing means;

S322, the content preparing means notifies the content distributing and managing means to prepare file transmission, and carriers in the notification file information to be distributed (such as a content logic identifier);

S324, the content preparing means establishes a link to a server in the content delivering and storing means that can store the file content (the server can assign enough resources to store the file) to transmit the content.

Figure 4:
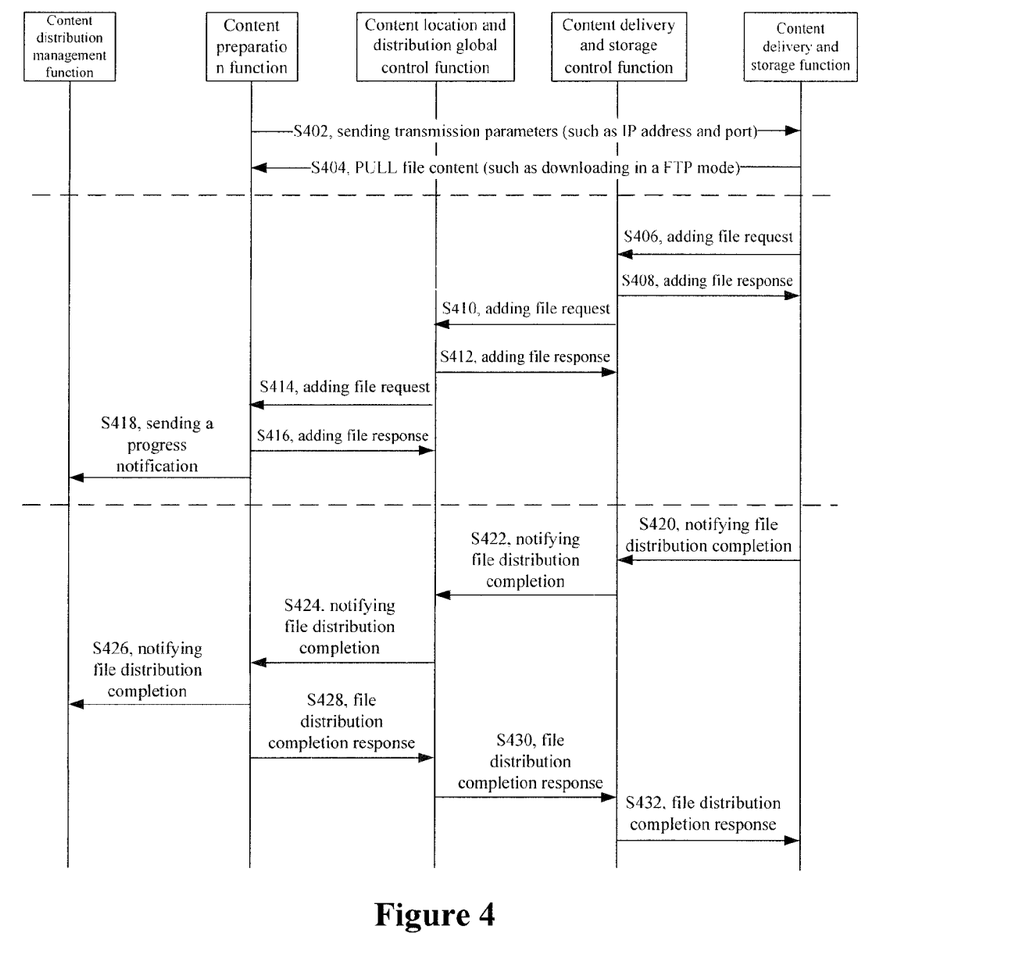
FIG. 4 is a flow chart of the PULL distribution mode according to a first embodiment of the present invention.
Figure 5:
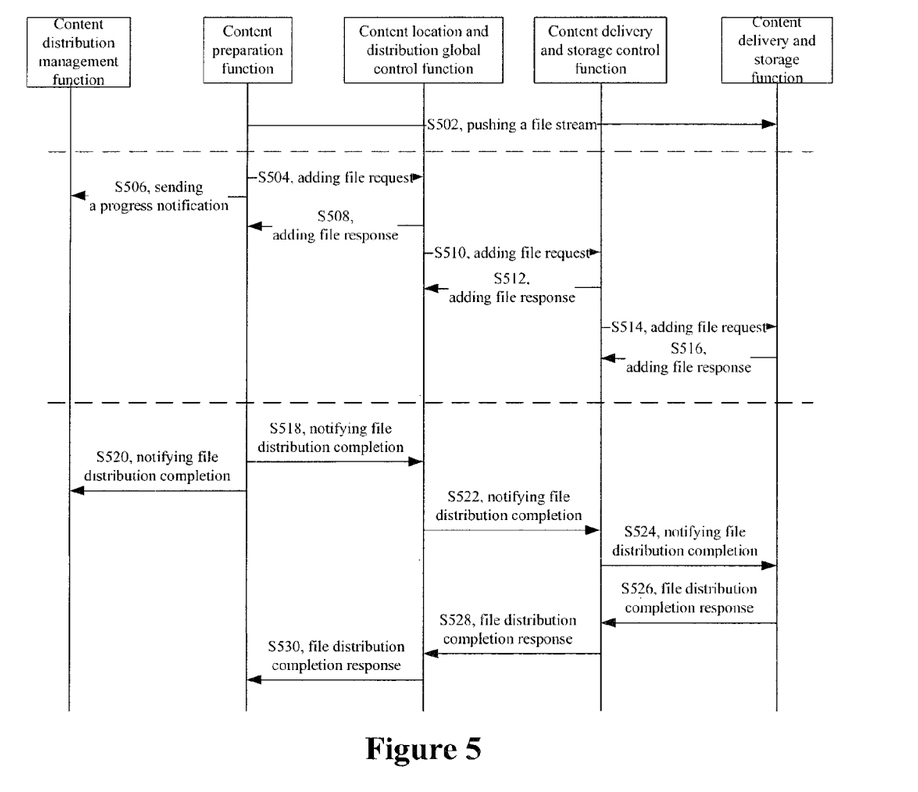
FIG. 5 is a flow chart of the PUSH distribution mode according to a second embodiment of the present invention.

For the transmission of the file content, the transmission mode can be that the server in the content delivering and storing means actively requests the file content from the content preparing means (referred to as a PULL mode), as shown in FIG. 4; and can also be that the content preparing means actively pushes the file content to the server in the content delivering and storing means (referred to as a PUSH mode), as shown in FIG. 5.

Embodiment 1 (A PULL Distribution Mode)

FIG. 4 is a flow chart of the PULL distribution mode according to the first embodiment of the present invention. As shown in FIG. 4, S324 in FIG. 3 includes the following steps:

S402, the content preparing means sends information such as IP address information and port corresponding to the file content to be sent by it, to the server in the content delivering and storing means that prepares to receive file storage;

S404, the server in the content delivering and storing means that prepares to receive file storage connects the content preparing means to establish a link and downloads the corresponding content therein (generally a ftp mode is used for downloading);

S406, the content delivering and storing means sends an adding file content request message to the content delivery and storage controlling means;

S408, the content delivery and storage controlling means sends an adding file content confirmation message to the content delivering and storing means;

S410, the content delivery and storage controlling means sends the adding file content request message to the content location and distribution global controlling means;

S412, the content location and distribution global controlling means sends the adding file content confirmation message to the content delivery and storage controlling means;

S414, the content location and distribution global controlling means sends the adding file content request message to the content preparing means;

S416, the content preparing means sends the adding file content confirmation message to the content location and distribution global controlling means;

S418, the content delivering and storing means sends a file distribution progress notification message to the content distributing and managing means;

S420, the content delivering and storing means sends a file content transmission completion confirmation message to the content delivery and storage controlling means;

S422, the content delivery and storage controlling means sends the file content transmission completion confirmation message to the content location and distribution global controlling means;

S424, the content location and distribution global controlling means sends the file content transmission completion confirmation message to the content preparing means;

S426, the content delivering and storing means sends a file content transmission completion notification message to the content distributing and managing means;

S428, the content preparing means sends a file content transmission completion response message to the content location and distribution global controlling means;

S430, the content location and distribution global controlling means sends the file content transmission completion response message to the content delivery and storage controlling means; and S432, the content delivery and storage controlling means sends the file content transmission completion response message to the content delivering and storing means.

In the above steps, S406-S418 are cycled according to system configurations (for example, a file downloading percentage), until the file distribution is completed and over.

Embodiment 2 (A PUSH Distribution Mode)

FIG. 5 is a flow chart of the PUSH distribution mode according to a second embodiment of the present invention. As shown in FIG. 5, S324 in FIG. 3 includes the following steps:

S502, the content preparing means sends a file content to the server in the content delivering and storing means that prepares to receive file storage (i.e. the PUSH mode) (generally a ftp manner is used for uploading);

S504, the content preparing means sends an adding file content request message to the content location and distribution global controlling means;

S506, the content preparing means sends a file distribution progress notification message to the content distributing and managing means;

S508, the content location and distribution global controlling means sends an adding file content confirmation message to the content preparing means;

S510, the content location and distribution global controlling means sends the adding file content request message to the content delivery and storage controlling means;

S512, the content delivery and storage controlling means sends the adding file content confirmation message to the content location and distribution global controlling means;

S514, the content delivery and storage controlling means sends the adding file content request message to the content delivering and storing means;

S516, the content delivering and storing means sends the adding file content confirmation message to the content delivery and storage controlling means;

S518, the content preparing means sends a file content transmission completion notification message to the content location and distribution global controlling means;

S520, the content preparing means sends the file content transmission completion notification message to the content distributing and managing means;

S522, the content location and distribution global controlling means sends the file content transmission completion notification message to the content delivery and storage controlling means;

S524, the content delivery and storage controlling means sends a file content transmission completion notification message to the content delivering and storing means;

S526, the content delivering and storing means sends the file content transmission completion confirmation message to the content delivery and storage controlling means;

S528, the content delivery and storage controlling means sends the file content transmission completion confirmation message to the content location and distribution global controlling means;

S530, the content location and distribution global controlling means sends the file content transmission completion confirmation message to the content preparing means.

In the above steps, S504-S516 are cycled according to system configurations (for example, a file downloading percentage), until the file distribution is completed and over.

Device Embodiment

According to the present invention, a file content distribution device is further provided, and the device can be used to realize the file content distribution method provided by the above method embodiment.

Figure 6:
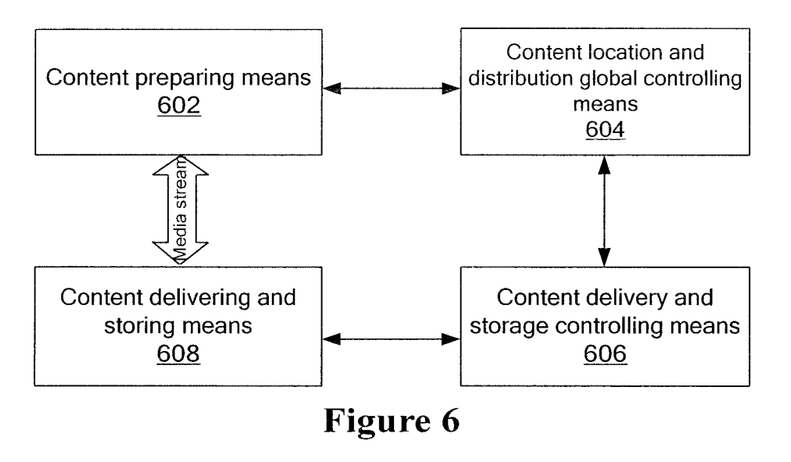
FIG. 6 is a block diagram of the file content distribution device according to the embodiment of the present invention.

FIG. 6 is a block diagram of the file content distribution device according to the present invention. It needs to be explained that although FIG. 6 only illustrates one content location and distribution global controlling means, one content delivery and storage controlling means and one content delivering and storing means, during specific application, the numbers of the means can be flexibly arranged in view of the needs during the application.

As shown in FIG. 6, the device according to the embodiment of the present invention includes: content preparing means 602, content location and distribution global controlling means 604, content delivery and storage controlling means 606, and content delivering and storing means 608, which will be detailed hereinafter.

Content preparing means 602, is configured to select one or more content location and distribution global controlling means 604, and to send file content distribution requests to the selected content location and distribution global controlling means 604;

Content location and distribution global controlling means 604, connected to the content delivery and storage controlling means 606, is configured to select, after receiving the file content distributing requests, one or more content delivery and storage controlling means 606 according to a predetermined distributing strategy, and to transmit the file content distribution requests to the selected content delivery and storage controlling means 606;

Wherein, the predetermined distributing strategy includes at least one of location information and load state information;

Content delivery and storage controlling means 606, connected to the content delivering and storing means 608, is configured to select, after receiving the file content distributing requests, one or more content delivering and storing means 608 according to the predetermined distributing strategy, and to transmit the file content distributing requests to the selected content delivering and storing means 608; and Content delivering and storing means 608, connected to the content preparing means 602, is configured to establish, after receiving the file content distributing requests, a link to the content preparing means 602 and to distribute file content.

Content delivering and storing means 608 includes at least one of the following: a delivering unit, a caching and storing unit and a distributing unit, wherein, the delivering unit is configured to send the file content to be delivered to a terminal user and provide file downloading and uploading from the terminal user; the caching and storing unit is configured to cache a time-shift live broadcast stream and store the file content; and the distributing unit is configured to, under the control of the content delivery and storage controlling means, distribute the live broadcast or time-shift stream and the file content in the content of the content delivering and storing means and receive the file content of the content preparing means.

Content location and distribution global controlling means 604 includes: a first location controlling unit configured to select the content delivery and storage controlling means according to a predetermined rule; and a first distribution controlling unit configured to process the file content distributing request from the content preparing means.

Wherein, the predetermined rule includes at least one of the following: the location information of the content delivery and storage controlling means; the load state information of the content delivery and storage controlling means; the load state information of the content delivering and storing means; terminal location information; terminal capability information; and content distribution information.

Content delivery and storage controlling means 606 includes at least one of the following: a delivery controlling unit configured to process media control information between the terminal user and the content delivering and storing means; a second location controlling unit configured to select the content delivering and storing means according to the predetermined rule; and a second distribution controlling unit configured to process the file content distributing request from the content location and distribution global controlling means.

Wherein, the predetermined rule includes at least one of the following: the location information of the content delivering and storing means; the load state information of the content delivering and storing means; terminal location information; terminal capability information; and content distribution information.

System Embodiment

According to the present invention, a file content distribution system is further provided, and the system can be used to realize the file content distribution method provided by the above method embodiment.

Figure 7:
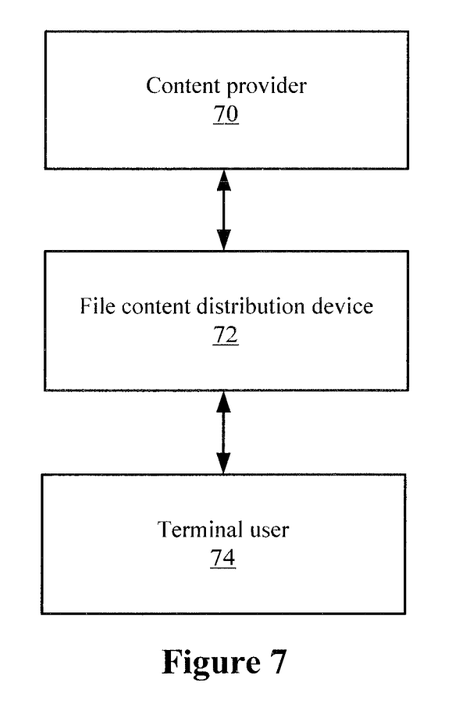
FIG. 7 is a block diagram of the file content distribution system according to the embodiment of the present invention.

FIG. 7 illustrates the file content distribution system according to the embodiment of the present invention, and as shown in FIG. 7, the system includes content provider 70, file content distribution device 72 and terminal user 74. Wherein, the file content distribution device 72 herein can be understood and implemented by referring to the above text in conjunction with the embodiment provided by FIG. 6, and thus is omitted here.

Preferably, terminal user 74 is an IPTV terminal user, and sends a service request to the file content distribution device 72, wherein, the service request includes at least one of broadcast on demand, live broadcast and a time-shift request.

Also, content provider 70 provides file content to file content distribution device 72, and the content preparing means in content provider 70 performs content processing to the file content, wherein, the processing includes at least one of the following: content aggregation, content management, metadata processing, and content encryption.

During specific implementations, the device and the system provided by the embodiments of the present invention can also complete the processing shown in FIGS. 1-5, and the description of the specific processing is omitted here.

Owing to the above description, the embodiments of the present invention can meet network systems of different scales, and according to actual situations of content sources and situations of users, the means can be expanded or reduced respectively. In addition, the present invention is clear and simple, and is compatible with a current IPTV based on IMS architecture, an IPTV based on NGN architecture, and an IPTV system based on non-NGN architecture. Functions of respective subsystems in the system are very clear, and the flow is excellent in expansibility, thus the present invention enhances low cost, dependability, and expansibility of every part of the interactive network television system, and advances core competitiveness of the IPTV system.

The descriptions above are only preferable embodiments of the present invention, which are not used to restrict the present invention. For those skilled in the art, the present invention may have various changes and variations. Any modifications, equivalent substitutions, improvements etc. within the spirit and principle of the present invention shall all be included in the scope of protection of the present invention.

What is claimed is:

1. A file content distribution method, applied in mutual interaction between the means in an interactive network television system including content preparing means, content location and distribution global controlling means, content delivery and storage controlling means and content delivering and storing means to complete the distribution of file content, including the following steps:

step 1, the content preparing means selecting one or more content location and distribution global controlling means, and sending a file content distributing request to the selected one or more content location and distribution global controlling means;

step 2, after receiving the file content distributing request, the content location and distribution global controlling means selecting one or more content delivery and storage controlling means according to a predetermined distributing strategy, and transmitting the file content distributing request to the selected one or more content delivery and storage controlling means;

step 3, after receiving the file content distributing request, the content delivery and storage controlling means selecting one or more content delivering and storing means according to the predetermined distributing strategy, and transmitting the file content distributing request to the selected one or more content delivering and storing means; and step 4, after receiving the file content distributing request, the one or more content delivering and storing means establishing a link to the content preparing means and distributing a file content;

step 5, determining whether there is a content distributing and managing unit in the content preparing means wherein when it is determined that there is not the content distributing and managing unit in the content preparing means, the method further includes:

the content distributing and managing unit inquiring about the file content that needs to be distributed; and the content distributing and managing unit sending the file content as inquired about to the content preparing means, wherein, the mode that the content distributing and managing unit inquiring about the file content that needs to be distributed at least includes:

automatically inquiring about a timing task;

step 6, when it is determined that there is the content distributing and managing unit in the content preparing means, the method further includes:

the content preparing means inquiring about the file content that needs to be distributed;

wherein, the mode that the content preparing means inquiring about the file content that needs to be distributed at least includes: automatically inquiring about a timing task.

2. The method according to claim 1, wherein in step 1, when there are multiple content location and distribution global controlling means, the mode that the content preparing means selects the content location and distribution global controlling means includes at least one of:

selecting according to a default configuration; and selecting according to selecting configuration information wherein the selecting configuration information at least includes:

the modular structure of the content location and distribution global controlling means, and information regarding the file content; and wherein, the information regarding the file content at least includes: the terminal location information of the file content.

3. The method according to claim 1, wherein step 3 further includes:

the content delivering and storing means sending a file content selection confirmation message to the content delivery and storage controlling means;

the content delivery and storage controlling means sending the file content selection confirmation message to the content location and distribution global controlling means; and the content location and distribution global controlling means sending the file content selection confirmation message to the content preparing means, wherein, the file content selection confirmation message includes: the location information of a media server that can store the file content.

4. The method according to claim 3, wherein when it is determined that there is not the content distributing and managing unit in the content preparing means, step 3 further includes:

the content preparing means notifying the content distributing and managing unit to start preparing the distribution of the file content and carrying the information of the file content to be distributed, and then executing step 4, wherein, the information of the file content to be distributed includes a content logic identifier.

5. The method according to claim 1, wherein in step 4, the distribution mode of the file content includes at least one of the following:

a PULL mode, wherein, the content delivering and storing means automatically acquires the file content from the content preparing means; and a PUSH mode, wherein, the content preparing means automatically sends the file content to the content delivering and storing means.

6. The method according to claim 5, wherein in the PULL mode, step 4 includes:

step a, the content preparing means sending a preparing PULL file request to the content delivering and storing means;

step b, the content delivering and storing means acquiring the file content in the content preparing means, according to the preparing PULL file request;

step c, the content delivering and storing means sending an adding file content request message to the content delivery and storage controlling means, and the content delivery and storage controlling means returning an adding file content confirmation message to the content delivering and storing means;

step d, the content delivery and storage controlling means transmitting the adding file content request message to the content location and distribution global controlling means, and the content location and distribution global controlling means returning the adding file content confirmation message to the content delivery and storage controlling means;

step e, the content location and distribution global controlling means sending the adding file content request message to the content preparing means, and the content preparing means returning the adding file content confirmation message to the content location and distribution global controlling means;

step f, the content delivering and storing means sending a file content transmission completed confirmation message to the content preparing means through the content delivery and storage controlling means and the content location and distribution global controlling means; and step g, the content preparing means sending a file content transmission completed response message to the content delivering and storing means through the content location and distribution global controlling means and the content delivery and storage controlling means.

7. The method according to claim 6, wherein in step a, the preparing PULL file request includes information corresponding to the file content to be pulled, wherein the information corresponding to the file content includes Internet Protocol, IP, address information and port information.

8. The method according to claim 6, wherein when there is not the content distributing and managing unit in the content preparing means, in step e, after the content preparing means returning the adding file content confirmation message to the content location and distribution global controlling means, the content delivering and storing means sending a file content distribution progress notification message to the content distributing and managing unit; wherein in step f, after the content location and distribution global controlling means sending the file content transmission completed confirmation message to the content preparing means, the content preparing means sending the file content transmission completed notification message to the content distributing and managing unit.

9. The method according to claim 5, wherein in the PUSH mode, step 4 further includes:

step A, when the content preparing means distributing the file content to the content delivering and storing means, the content preparing means sending an adding file content request message to the content location and distribution global controlling means, and the content location and distribution global controlling means returning an adding file content confirmation message to the content preparing means;

step B, the content location and distribution global controlling means sending the adding file content request message to the content delivery and storage controlling means, and the content delivery and storage controlling means returning an adding file content confirmation message to the content location and distribution global controlling means;

step C, the content delivery and storage controlling means sending the adding file content request message to the content delivering and storing means, and the content delivering and storing means returning the adding file content confirmation message to the content delivery and storage controlling means;

step D, the content preparation means sending a file content transmission completed notification message to the content delivering and storing means through the content location and distribution global controlling means and the content delivery and storage controlling means; and step E, the content delivering and storing means returning a file content transmission completed confirmation message to the content preparing means through the content delivery and storage controlling means and the content location and distribution global controlling means.

10. The method according to claim 9, wherein when there is not the content distributing and managing unit in the content preparing means, in step A, after the content preparing means sends the adding file content request message to the content location and distribution global controlling means, the content preparing means sends a file distribution progress notification message to the content distributing and managing unit; wherein in step D, after the content preparing means sends the content transmission completed notification message to the content location and distribution global controlling means, the content preparing means sends the file content transmission completed notification message to the content distributing and managing unit.

11. A file content distribution device, including: at least one content preparing means, at least one content location and distribution global controlling means, at least one content delivery and storage controlling means, and at least one content delivering and storing means, wherein, the content preparing means, configured to select one or more content location and distribution global controlling means from the at least one content location and distribution global controlling means, and send file content distributing requests to the selected content location and distribution global controlling means;

the selected one or more content location and distribution global controlling means, configured to select, after receiving the file content distributing requests, one or more content delivery and storage controlling means according to a predetermined distributing strategy, and transmit the file content distributing requests to the selected content delivery and storage controlling means, wherein the predetermined distributing strategy includes performing distribution according to load state information;

the selected one or more content delivery and storage controlling means, configured to select, after receiving the file content distributing requests, one or more content delivering and storing means according to the predetermined distributing strategy, and transmit the file content distributing requests to the selected content delivering and storing means; and the selected one or more content delivering and storing means, configured to establish, after receiving the file content distributing requests, a link to the content preparing means and distribute the file content.

12. The device according to claim 11, wherein the content delivering and storing means includes at least one of: a delivering unit, a caching and storing unit, and a distributing unit; wherein, the delivering unit is configured to send the file content to be delivered to a terminal user and provide file downloading and uploading from the terminal user;

the caching and storing unit is configured to cache a time-shift live broadcast stream and store the file content; and the distributing unit is configured to distribute, under the control of the content delivery and storage controlling means, the live broadcast or time-shift stream and the file content in the content of the content delivering and storing means, and receive the file content of the content preparing means.

13. The device according to claim 11, wherein the content location and distribution global controlling means includes at least one of the following: a first location controlling unit, configured to select the content delivery and storage controlling means according to a predetermined rule; and a first distribution controlling unit, configured to process the file content distribution request from the content preparing means, wherein, the predetermined rule includes at least one of the following:

performing selection according to the location information of the content delivery and storage controlling means;

performing selection according to the load state information of the content delivery and storage controlling means;

performing selection according to the load state information of the content delivering and storing means;

performing selection according to terminal location information;

performing selection according to terminal capability information; and performing selection according to content distribution information.

14. The device according to claim 11, wherein the content delivery and storage controlling means includes at least one of the following: a delivery controlling unit, configured to process media control information between the terminal user and the content delivering and storing means; a second location controlling unit, configured to select the content delivering and storing means according to the predetermined rule; and a second distribution controlling unit, configured to process the file content distributing requests from the content location and distribution global controlling means, wherein, the predetermined rule includes at least one of the following:

performing selection according to the location information of the content delivering and storing means;

performing selection according to the load state information of the content delivering and storing means;

performing selection according to terminal location information;

performing selection according to terminal capability information; and performing selection according to content distribution information.

15. A file content distribution system, including the file content distribution device according to claim 11, a content provider, and a terminal user.

16. The system according to claim 15, wherein the terminal user is configured to send a service request to the file content distribution device, wherein, the service request includes at least one of the following: broadcast on demand request, live broadcast request and a time-shift request.

17. The system according to claim 15, wherein the content preparing means in the file content distribution device is configured to perform content processing to the content provided by the content provider, wherein, the content processing includes at least one of the following: content aggregation, content management, metadata processing, and content encryption.

* * * * *